Figure 1:
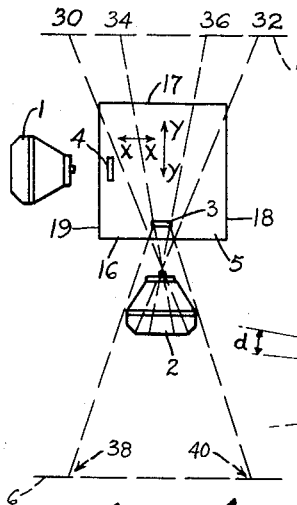

May 24, 1960 Y. NUBAR ET AL 2,937,585
DEVICE FOR MEASURING THE ORIENTATION OF A SURFACE
Filed March 31, 1954

INVENTOR
YVES NUBAR
WILLIAM H. HEATH
BY
ATTORNEYS

United States Patent Office 2,937,585
Patented May 24, 1960

2,937,585

DEVICE FOR MEASURING THE ORIENTATION OF A SURFACE

Yves Nubar, Mount Vernon, and William H. Heath, Bronx, N.Y., assignors, by mesne assignments, to the United States of America as represented by the Secretary of the Navy Filed Mar. 31, 1954, Ser. No. 420,218

3 Claims. (Cl. 95—12.5)

The present invention relates to an optical measuring device and method and more particularly to a device and method utilizing the comparison of horizon segments separated by 180 degrees to determine the orientation of a plane surface relative to the true vertical. The device is especially applicable to the accurate measurement and recording of the deviation of a stabilized platform from the true horizontal position since it utilizes optical means that do not increase the inertia of the stabilized platform, or present a loading effect to the stabilized platform.

A stabilized platform has wide application when used in conjunction with an aircraft. One of the major applications or utilizations of a stabilized platform is in the aerial photography field. The aerial camera is mounted to the stabilized platform in a convenient manner that will allow the camera to scan and photograph the terrain below. In many instances it will be almost impossible for the plane to fly a straight, true, uniform horizontal course because of air turbulence, change of wind, lack of skill of the pilot and the like.

Because it is practically impossible to continuously and constantly maintain a stabilized platform in a perfectly true horizontal position at each and every instant, without variations or fluctuations, numerous methods are utilized to read the deviations.

By knowing the angular deviation of the camera from the true vertical position, at the instant of exposure, the final print can be rectified to the true horizontal plane. Thus, each exposure of an aerial camera can be immediately rectified to give accurate photographs of the terrain below.

One method that is utilized to determine the angular deviation of a stabilized platform from the true horizontal position, is to photograph the horizons by means of cameras that are mounted upon the stabilized platform. The cameras are mounted in pairs, back to back. The said cameras are optically spaced 180 degrees apart. Another combination of cameras bearing the same relationship to each other as said first mentioned combination of cameras, are mounted on the stabilized platform and displaced from any one of the first combination of cameras by an angle of 90 degrees.

With this method it is possible to photograph, simultaneously, four different portions of the horizon that are displaced 90 degrees apart. Thus it is possible to obtain the angular deviation of the stabilized platform at the instant of exposure.

This method has the following obvious disadvantages. The size of the stabilized platform must be increased to accommodate the four cameras. The mounting of each camera is very critical with respect to each of the other cameras and a slight misalignment of any one of the cameras will result in false information as to the angular tilt of the platform. Another very serious disadvantage of this method is that the weight of the cameras greatly increases the inertia of the platform. As the inertia of the platform increases the possibility of introducing errors becomes greater. Small vibrations are also transmitted to the platform at each instant that the shutter is clicked and every time that the film is automatically advanced.

Another method involving the same principle as the above mentioned method for determining the angular displacement of a plane surface is the utilization of four cameras that follow the tilt of the plane surface by means of servomechanical connections. The said cameras are placed at any convenient location other than on the horizontal platform itself. The cameras accurately follow and reproduce all angular deviations of the stabilized plane surface by means of servomechanical connections. With this system each camera is optically situated in the same position and scans the same area as the corresponding camera of the above mentioned method.

This system, since it utilizes servomechanisms, has the following disadvantages. The system is very involved and requires constant maintenance by skilled technicians. The auxiliary equipment is heavy and costly. A slight mal-functioning of a component of the servo system will result in inaccurate results. The mal-functioning of the equipment may not be apparent until the operational procedures have been completed thus requiring additional operations or complete rejection of the results.

The present invention utilizes two cameras that are optically spaced 90 degrees apart, although this spacing is not critical. The cameras are rigidly attached to some convenient stationary base located near the horizontal surface with each camera optically facing said plane surface. A reflecting means is mounted on the plane surface and located immediately in front of each camera. By utilizing the reflecting means, the horizon immediately in front of and immediately behind the camera is scanned and photographed simultaneously by said camera. The alignment of the front and rear horizon segments with respect to each other is then compared, any misalignment indicating a deviation of the plane surface from the true horizontal (or true vertical, since the latter is effectively the true horizontal plus 90°). The numerical amount of the deviation can be simply and accurately derived from measurement of the amount of misalignment.

By using the present invention, the number of cameras required is reduced, the inertia of the platform is not increased by any appreciable amount, the size of the platform is held to an absolute minimum and the stabilized platform is free of all direct and reflected loading.

One object of the present invention is to provide an optical system that will record accurately the angular displacement of a plane surface.

Another object of the present invention is to provide a system that will not load the plane surface when measuring the angular deviation of said plane surface from the true horizontal position.

Another object of the invention is to provide a system that will permanently record the angular deviation of each axis of a platform on film.

An additional object of the invention is to provide a system that will record the angular deviation of a platform without increasing the inertia of said platform.

Another object of the invention is to provide a system that will require a negligible amount of space for equipment on the platform itself, thus allowing the platform size to be decreased to an absolute minimum.

A further object of the present invention is to provide a system that will be relatively free of vibrations and chatter that is attributable to the operation of the cameras.

It is another object of the invention to provide a means of recording the angular deviation of a plane surface from the true horizontal position that is simple in operation, light in weight and accurate in results.

Figures 2, 5, 7:
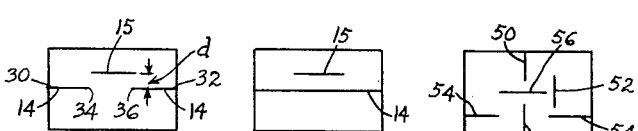
Figure 3:
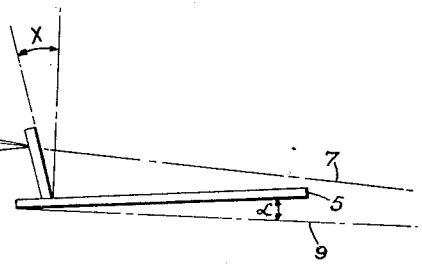
Figure 4:
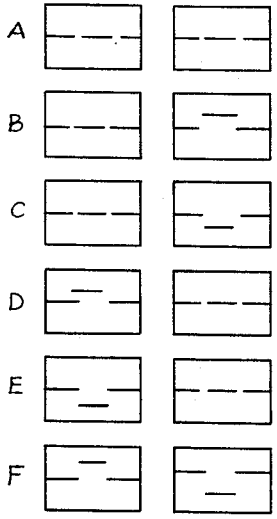
Figure 6:
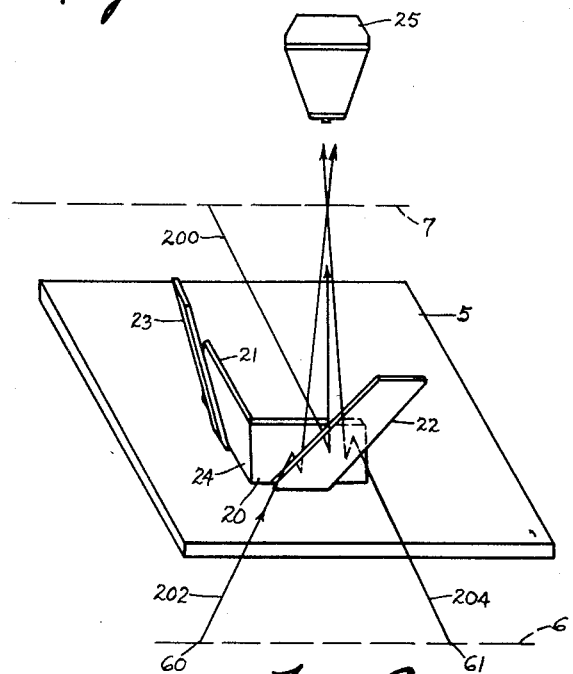

Other objects and many of the attendant advantages of this invention will be readily appreciated as the same becomes better understood by reference to the following detailed description when considered in connection with the accompanying drawings wherein:

Fig. 1 is a plan view of a horizontal surface containing two mirrors and the two cameras that photograph the horizons, Fig. 2 is a reproduction of a possible picture that may be produced by either camera of Fig. 1, Fig. 3 is utilized to show the relationship between the angular displacement of a non-stabilized plane surface, the focal length of the camera and the actual physical displacement of the two horizons as shown on the photographic film, Fig. 4 is a facsimile of a number of possible pictures of the horizons that can be obtained from the system that is illustrated in Fig. 1, Fig. 5 is a facsimile of the picture that is produced by one of the cameras of the system that is shown in Fig. 1 when a half silvered mirror is used as a reflecting surface, Fig. 6 is a modification of the present form of the invention, and Fig. 7 is a facsimile of the picture that is produced by the camera of the system that is shown in Fig. 6.

Referring now to the form of the present invention as disclosed in Fig. 1, a plane surface or platform 5 is mounted on any convenient means. The plane surface may be rigidly attached to some means as, for example, a boat or an airplane. The plane surface may be rigidly mounted to the frame of the structure of the vehicle that contains it, or the plane surface may be stabilized, in the horizontal plane, by some convenient or well known means such as a gyroscope.

It is to be understood that the present invention is not limited in scope to a horizontal surface or plane surface and may also be used in combination with a vertical surface. Although a principal use of a stabilized plane in an airframe is in conjunction with aerial photography, it is to be understood that the present invention is not limited to this restrictive use. The present invention may be utilized whenever it is necessary to determine the angular deviation of a plane surface from the true horizontal plane.

When the present invention is used in conjunction with a vertical surface, a simple optical means, that is well known to those experienced in the art, is required to rotate the images of the horizons through an angle of 90 degrees. The rotation of the horizons is required so that the vertical surface or platform, when in the true vertical position, will be parallel to the rotated images of the horizons. The operational procedure of the present invention, in determining the angular deviation of a plane surface from its true position, is the same for a vertical and a horizontal plane. Therefore, for illustrative purposes only, the discussion of the present invention will be confined to the determination of the angular displacement of a horizontal surface.

Referring to Fig. 1, a reflecting surface 3 is rigidly mounted to the horizontal surface 5. The reflecting surface is a full reflecting mirror mounted in a vertical position on platform 5. The mirror 3 is mounted near one edge 16 of said platform 5. A second reflecting surface 4, that is identical in all respects to reflecting surface 3 is vertically mounted near another edge 19 of platform 5. Reflecting surface 4 is mounted so that it is physically and optically displaced 90 degrees from the reflecting surface 3. Two cameras 1 and 2 are securely attached to some convenient means in fixed spatial relationship to the body of the aircraft. The cameras do not physically touch or contact the platform 5. The cameras 1 and 2 are mounted so that they are optically 90 degrees apart, although the 90 degree spacing is not critical. Each camera views the reflecting surface of the corresponding mirror 3 or 4 in front of it and also views the area or horizon that appears on each side of its respective mirror. One of the cameras is utilized to determine the angular displacement of the platform in the X—X plane and the other camera performs the same function for the Y—Y plane. Each camera operates in an identical manner. Therefore the following explanation will be confined to the operation of camera 2.

The horizons of the earth are always perfectly horizontal. Therefore, the invention utilizes the horizons of the earth, as a standard, to determine the angular deviation of a plane surface. The camera 2 views two portions of the horizon that are displaced from each other by an angle of 180 degrees. The angle of view of the camera 2 is wider then the width of the mirror 3. Therefore the camera views the horizon that is directly in front of the camera lens and that appears on each side of the mirror 3. Thus, if the camera views the horizon 7 from point 30 to point 32; that portion of the horizon 7 between points 34 and 36 will not be viewed by the camera 2 because of the obstruction of the mirror 3. Therefore camera 2 will view the horizon 7 from points 30 to 34 and from points 36 to 32. The horizon 6 that is located directly behind the camera 2 is viewed by the camera 2 through the action of the mirror 3 that is located directly in front of the camera 2. Said camera 2 views a portion of the horizon 6 between points 38 and 40 through the action of the mirror 3.

An image of the two horizons 6 and 7 as viewed by the camera 2 is represented by Fig. 2. The line 14 represents the horizon 7. The discontinuity of the horizon 7 between points 34 and 36 is that portion of the horizon that is blocked by the mirror 3. The line 15 represents the horizon 6 as viewed by the camera 2 through the mirror 3.

If the camera 2 takes a photograph when the platform 5 is in a true horizontal position, then line 15 and lines 14, of Fig. 2, will coincide. Referring to Fig. 3, if the platform 5 deviates from the true horizontal position 9 by an agle of $\alpha$, then the mirror 3 will assume an angle X that is directly proportional to the angular displacement $\alpha$ of the platform 5. The angular displacement of the mirror 3 results in a displacement of the reflected horizon 6 from the directly viewed horizon 7. The greater the angular displacement or tilt of the platform 5, then the greater the separation of the two horizons 6 and 7 as they appear on the photographic film.

Referring to Fig. 3 it can be readily seen that the distance $d$ between the reflected horizon 6 and the directly viewed horizon 7, as it appears on the photographic film, can readily be converted to angular tilt of the platform by the use of the formula:

$$\tan \alpha = \frac{d}{2f}$$

where $d$ is the distance between the two horizons 6 and 7 as measured from the photographic film and $f$ is the focal length of the camera that took the picture. Therefore, by photographing the horizons with the cameras 1 and 2 simultaneously, the angular deviation of the plane surface 5 can be easily determined at any given instant.

When the present invention is operating, the cameras 1 and 2 take photographs simultaneously at some predetermined interval of time. Referring to Fig. 4, items A, B, C, D, E and F are facsimiles of photographs taken with cameras 1 and 2 at various angles of tilt of the platform 5 of Fig. 1.

Returning, for an instant to Fig. 1, if an upward movement of the edge 16 indicates a positive tilt angle of the platform 5 in the Y—Y plane, then a fall or downward movement of edge 16 will indicate a negative tilt angle of the platform 5 in the Y—Y plane. The same assumptions, relating to the positive and negative angles of tilt, are adhered to in relationship to the edge 19, of the platform 5, for movement in the X—X plane.

Again referring to Fig. 4, photograph A indicates that the platform is perfectly horizontal.

The photograph B indicates that the platform 5 is horizontal in the X—X plane but is tilted at an easily determinable positive angle in the Y—Y plane.

The photograph F indicates that the platform 5 is tilted at a readily determinable positive angle in the X—X plane and is also tilted at a readily determinable negative angle in the Y—Y plane.

Photographs C, D and E indicate a few of the possible combinations of photographs that may be obtained. From these photographs the true angular deviation of the platform 5, from the true horizontal, may be readily determined.

In the above description of the invention, the cameras were mounted in a horizontal position. Occasions may arise where the platform, and the cameras that are utilized to measure the angular tilt of the platform, are located far above the surface of the earth. When this last mentioned condition exists, the cameras or the reflecting means may then have to be placed at some convenient angle to the horizontal to view the horizons. Under this new operating condition, the photographic results that are obtained may be similar to those that are illustrated by Fig. 4 or by Fig. 5 as the reflecting means 3 may not obscure any portion of the horizon 7. The form of the resultant photograph will depend upon the placing of the camera with respect to the location of the mirror.

From the foregoing it will become apparent to those experienced in the art that the present invention may be modified and thus carried out in other ways. For example, referring to Fig. 1, prisms may be substituted for the mirrors 3 and 4.

Another modification of the present invention is to substitute half-silvered mirrors for the total reflecting type as described above. When said half silvered types of mirrors are used, line 14 of Fig. 2 will be continuous and an image as illustrated by Fig. 5 will appear on the photographic film.

Another alternate method of construction of the present invention may be that illustrated in Fig. 6. With this type of construction a single camera 25 is utilized to replace the two cameras 1 and 2 as described originally. The reflecting surface of a mirror 20 is mounted vertically on the platform 5. The reflecting surface of a second mirror 21 is mounted vertically on said platform 5 and at right angles to said mirror 20 so that one end of each of said mirrors 20 and 21 have a common edge 24. Mirror 22 is mounted on said platform 5 and at an angle of approximately 45 degrees to said plane 5. Therefore said mirror 22 will also form an angle of approximately 45 degrees with said vertically mounted mirror 20. The silvered or reflecting surface of said mirror 22 faces or views the silvered or reflecting surface of the mirror 20. The mirror 22 is longer than the mirror 20 so that mirror 22 views the horizon 7 over the top of the mirror 20. The mirror 20 is wider than the mirror 22 so that mirror 20 views the horizon 6 on each side of the mirror 22. Mirror 23 bears the same physical and optical relationship to the mirror 21 as the mirror 22 bears to the mirror 20. A camera 25 is securely mounted to a convenient means directly above but not attached to the stabilized platform 5. The camera 25 faces downward and views the mirrors 20, 21, 22 and 23. The mirrors 20, 21, 22 and 23 are adjusted to reflect and divert four portions of the horizon that are consecutively displaced 90 degrees from each other, into the lens of the camera 25. The mirror 22 diverts an image of the horizon 7 that is located directly in front of its reflecting surface, from the horizontal plane to the vertical plane. The mirror 22 diverts the image of the horizon 6, that is located 180 degrees from said horizon 7; from the horizontal plane to the vertical plane. Thus the horizon 6 is viewed by the camera 25 through the mirror 22 and then through mirror 20.

That portion of the horizon 6 between 60 and 61 is obscured by the mirror 22 and, therefore, will not be viewed by the camera 25. In Fig. 6, a ray of light from the horizon 7 is represented by the line 200 and two light rays from the horizon 6 are represented by the lines 202 and 204.

The combination of mirrors 21 and 23 performs and operates in the same manner as the combination of the mirrors 20 and 22. One of the combination of mirrors views two horizons that are located 180 degrees apart. The other combination of mirrors views other portions of the horizon that are 180 degrees apart and are displaced 90 degrees from either of the horizons 6 or 7. The operation of this alternate method of construction is identical to that described originally except one camera is used instead of two.

Referring to Fig. 6, when half silvered mirrors are used exclusively instead of fully reflective mirrors as described above, a ray of light from the horizon 7 passes through the half-silvered mirror 20. The light ray then falls upon the reflecting surface of the half-silvered mirror 22 and is then reflected upward to the camera 25. A ray of light from the horizon 6, passes through the half-silvered mirror 22 and falls upon half-silvered mirror 20. The mirror 20 reflects this light beam to the reflecting surface of mirror 22. The mirror 22 then reflects light ray 202 upward to the camera 25.

Fig. 7 is a reproduction of the photograph that is obtained with camera 25 when all the mirrors are fully reflecting. In this instance, the images of all four horizons appear on one film frame. In Fig. 7, lines 50 represent one horizon and line 52 represents the horizon that is displaced 180 degrees from that horizon that is represented by lines 50. Lines 54 and 56 represent the other set of horizons. The images 50, 52, 54 and 56 of the horizons, as illustrated in Fig. 7, will be continuous from one edge of the film to the other edge of the film when half-silvered mirrors are used.

As is obvious to those that are experienced in the art; in the above described modification of the present invention that uses one camera instead of two cameras; half-silvered mirrors, fully silvered mirrors or prisms may be utilized. After further thought it will also become obvious that any combination of fully reflecting mirrors, half-silvered mirrors or prisms may also be used.

To those that are experienced in the art it will be obvious that the mirrors or prisms, that are mounted on the platform and at 45 degrees to said platform, may be physically, but not optically, moved without departing from the spirit of the invention. For example, the mirror or prisms may be mounted directly to the camera.

It is obvious that the reflecting means may be mounted other than on a plane surface. The reflecting means may be mounted on a sphere, or a rod, or a tube and the like and thereby measure the orientation or deviation of said structure.

Obviously many modifications and variations of the present invention are possible in the light of the above teachings. It is therefore to be understood that within the scope of the appended claims the invention may be practiced otherwise than as specifically described.

What is claimed is:

1. A device for measuring the orientation of a surface relative the horizon comprising a first platform, first reflecting means mounted on said platform to view first portions of said horizon, second reflecting means mounted on said platform to view second portions of said horizon, first recording means mounted to view simultaneously third portions of said horizon displaced substantially 180 degrees from said first portions and said first reflecting means and second recording means mounted to view simultaneously fourth portions of said horizon displaced substantially 180 degrees from said second portions and said second reflecting means.

2. A device for measuring the orientation of a surface relative the horizon comprising a first platform, first reflecting means mounted on said platform to view first portions of said horizon, second reflecting means mounted on said platform to view second portions of said horizon, first recording means mounted to view simultaneously third portions of said horizon diametrically opposite said first portions and said first reflecting means and second recording means mounted substantially 90° from said first recording means to view simultaneously fourth portions of said horizon diametrically opposite said second portions of said horizon and said second reflecting means.

3. The combination of claim 2 wherein said reflecting means comprise prisms.

References Cited in the file of this patent

UNITED STATES PATENTS

| | | |
|---|---|---|
| 1,626,787 | Corlett | May 3, 1927 |
| 1,709,314 | Henderson | Apr. 16, 1929 |
| 2,047,070 | Horner | July 7, 1936 |
| 2,671,388 | Brubaker | Mar. 9, 1954 |

FOREIGN PATENTS

| | | |
|---|---|---|
| 650,826 | Great Britain | Mar. 7, 1951 |